W. & J. B. Aiken.
Knitting Machine.
No. 2,419. Reissued Dec. 18, 1866.
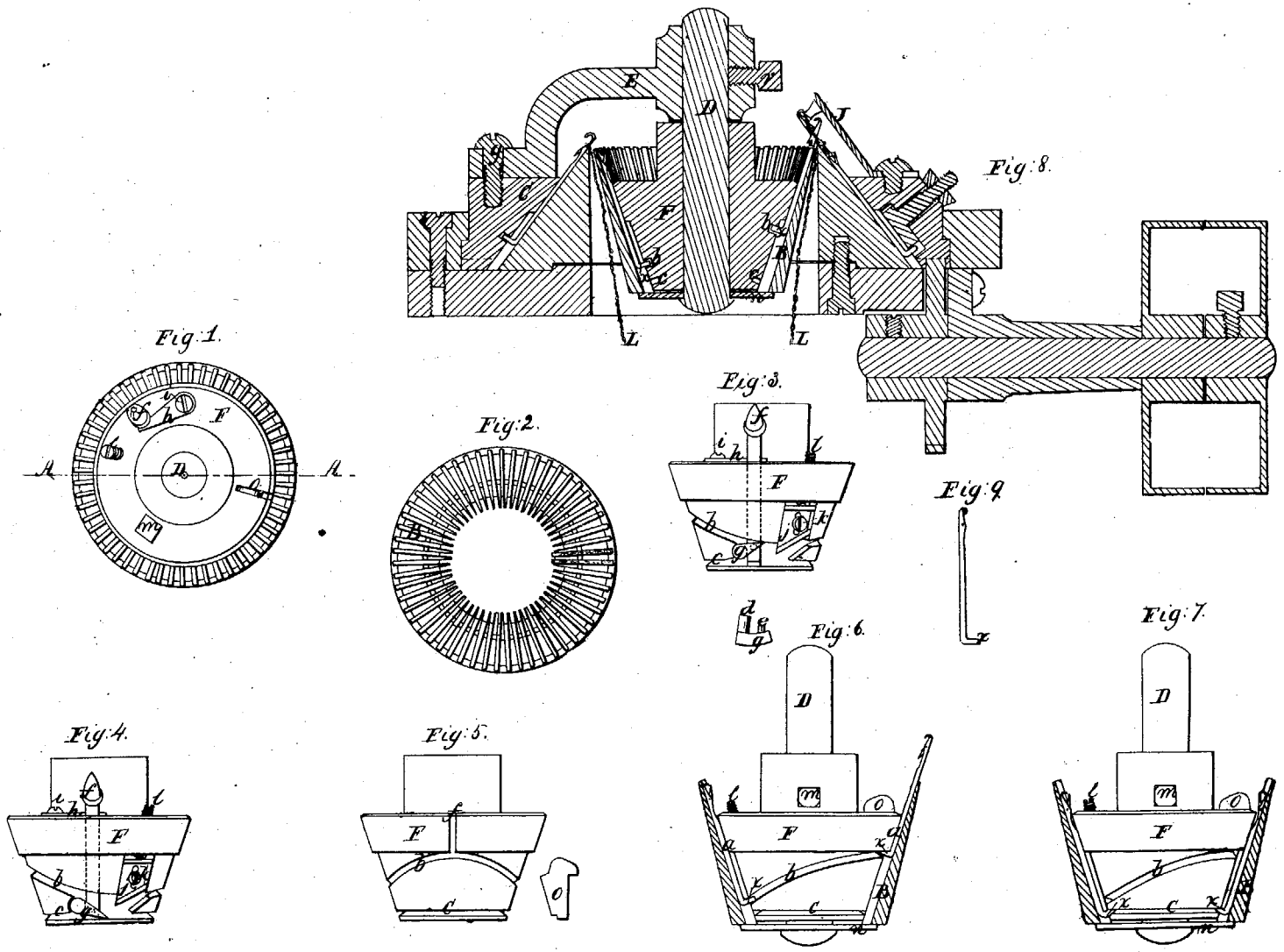
N. PETERS, PHOTO-LITHOGRAPHER, WASHINGTON, D. C.

UNITED STATES PATENT OFFICE.

JONAS B. AIKEN, OF FRANKLIN, NEW HAMPSHIRE, ASSIGNEE, BY MESNE ASSIGNMENTS, OF J. B. & W. AIKEN.

IMPROVEMENT IN KNITTING-MACHINES.

Specification forming part of Letters Patent No. 15,314, dated July 8, 1856; reissue No. 2,419, dated December 18, 1866.

*To all whom it may concern:*

Be it known that WALTER AIKEN and JONAS B. AIKEN, of Franklin, in the county of Merrimack and State of New Hampshire, have invented certain new and useful Improvements in Knitting-Machines, which consist in the construction and combination of several parts for the operation of a series of needles designed to be attached to the circular plain-work knitting-machine (for which Letters Patent were granted to us the 11th day of September, 1855,) thereby producing ribbed fabric, of which the following is a full and clear description, reference being had to the annexed drawings, making part of this specification.

Figure 1 is a plan of the several parts combined. Figs. 2, 3, 4, 5, 6, and 7 are elevations and detachments of Fig. 1, hereafter to be described. Fig. 8 is a sectional view of the plain-work knitting-machine referred to, and of Fig. 1 upon the line A A. Fig. 9 represents the kind of needle used.

To enable others skilled in the art to make and use our improvements, we will proceed to describe the method which we have adopted of carrying it out.

B is a plan of the hollow conical needle-plate, (seen in Fig. 2,) having grooves cut in its inner surface for the reception of the needles. They are made of a depth sufficient to hold the needles steadily in their places, and at the same time to allow them to slide freely up and down. The needles when placed in the grooves are flush with the inner surface of the plate, which is made conical at an angle of twenty degrees, or thereabout, as being the best adapted to produce the desired action of the needles; but it may be varied to a greater or less angle. By means of this form of the plate, needles of a greater length can be used than in a plate which is made horizontal, particularly in machines of a small size. Figs. 3, 4, and 5 are elevations of the driving-plate F, which operates the needles. The exterior conical surface of this plate corresponds with and rests upon the interior conical surface of the needle-plate B. Thus the needles are held in their proper positions between the plates, as seen in Fig. 6, at *a a*. This plate has two grooves, *b* and *c*, cut in its outer surface, one for operating the needles, and the other for the retreat of the needles. The operating groove *b* is an inclined eccentric groove, into which project the arms of the needles *x*. At the left, in Fig. 6, is seen a needle in the lowest portion of the groove. At the right is seen a needle in the highest portion of the groove. C is a horizontal groove near the bottom of the driving-plate, which we denominate the retreating-groove, into which the arms of the needles are made to pass when not required in operation, as seen in Fig. 7. They are guided into this groove by a device which we denominate the needle-switch. It is seen at *g* in Fig. 3. It is made in the form of a wedge, and sunk in a cavity in the driving-plate, between the operating and retreating grooves, to such a depth as to be flush with the surface. It is seen in place in Fig. 4, which position it retains when the needles are in operation. It is pivoted to the plate by the pin *d*, seen in Fig. 3. *e* is a small pin, which connects the handles *f* with the needle-switch. By depressing the handle the switch is moved down, as shown at *g*, Fig. 4, thereby guiding the needles into the operating groove. When the handle is raised it moves the switch to its former position, and the needles are conducted into the retreating groove. The handle is kept in position when raised or depressed by the latch *h*, which enters a notch in the handle *f*. It is attached to the driving-plate by the screw *i*, seen in plan in Fig. 1, and in Figs. 3 and 4. In Figs. 3 and 4 is shown the loop-regulator, which does not differ materially from that previously patented by us. It is sunk in a cavity at the lowest point of the inclined eccentric groove to such a depth as to be flush with the surface of the plate. It has a longitudinal movement in the cavity, and is kept in place by the screw *k*. When a longer loop is required to be drawn, the loop-regulator must be depressed in the cavity for that purpose. This is done by turning the regulating-screw *l* downward, and vice versa, when a shorter loop is required. The driving-plate F revolves freely in the needle-plate B. These two plates with their appurtenances are held together and suspended by the vertical shaft D, which passes through the center of the driving-plate, and is confined therein by the screw *m*, (seen in plan and in Figs. 6 and 7.) This shaft has a shoulder at its lower end, upon which is placed the collar *n* that supports the needle-plate, (shown also in Figs. 6 and 7,) when the several parts are adjusted in the manner described. It is then ready to insert the needles, which is done in the following manner: By taking out the gate *o*, (seen in plan and in Fig. 5,) a channel is opened communicating with the operating groove *b* at *p*, through which the needles are passed to the respective grooves in the needle-plate; also when a needle becomes broken or impaired, it can be taken out and another inserted in like manner.

The manner in which this series of needles is made to operate having been now explained, we will proceed to describe its operation when attached to the machine referred to for knitting plain fabric, thereby producing ribbed fabric. E is a connecting arm seen in section, Fig. 8, attached to plate *c* by the screw *g*. Through the other extremity of this arm the vertical shaft D passes, and is secured by the screw *r*. The ribbing-series cross those of the plain series of needles, as seen at the right in section, Fig. 8. Thus the needle-plate B is prevented from turning by means of the two series of needles intersecting each other, leaving the inner plate F free to revolve and operate the needles without any connection between the two plates, the whole being suspended in the center of the plain-fabric machine by the connecting-arm E and the vertical shaft D. The yarn is fed into the plain series of needles by the yarn-carrier J, the ribbing-series being in the operating groove *b*, as seen at the right in section, Fig. 8. The hooks of the plain series catch the yarn, each one in succession, and draw it in for their loops, at the same time drawing it around the ribbing-needles, thereby forming the ribbing-loops. At the left is seen a ribbing-needle just after it has drawn a loop through the fabric. The fabric knit being held back by the edge of the needle-plate B, passes down the outside of the plate as fast as knit, as seen at L. When plain fabric is required to be knit, the ribbing-needles must be passed down into the retreating-groove, as described, for that purpose; or the whole ribbing part may be detached.

What I claim as new, and desire to secure by Letters Patent, is—as the invention of the said JONAS B. AIKEN and WALTER AIKEN—

1. The hollow circular needle-plate, having grooves cut on its inner surface, substantially as described, for the object specified.

2. The horizontal groove *c*, near the bottom of the cone, so arranged in relation to the inclined operating groove that the needles may be retreated thereto, substantially as described, and retained therein when they are not wanted to operate on the fabric knit, in the manner set forth.

3. The switch *g* arranged, substantially as described, to change the needles from the inclined operating groove to the retreating-groove.

4. The use of the two sets of sliding needles in rotary knitting-frames called the plain series and the ribbing-series, arranged and operated substantially as set forth.

JONAS B. AIKEN.

Witnesses:
N. H. SANBORN,
O. C. BROWN.